United States Patent

Takahata et al.

[19]

[11] Patent Number: 6,108,495
[45] Date of Patent: Aug. 22, 2000

[54] CAMERA

[75] Inventors: Junji Takahata, Sakai; Hiroshi Ueda, Habikino; Hironori Kamishita, Osaka; Koutaro Kawabe, Sakai, all of Japan

[73] Assignee: Minolta Co., Ltd., Osaka, Japan

[21] Appl. No.: 09/299,924

[22] Filed: Apr. 28, 1999

[30] Foreign Application Priority Data

May 18, 1998 [JP] Japan ................................ 10-134756

[51] Int. Cl.[7] ................................................. G03B 13/18
[52] U.S. Cl. ........................... 396/89; 396/106; 396/111; 396/128
[58] Field of Search ................................ 396/89, 91, 93, 396/106, 107, 108, 109, 111, 113, 114, 125, 128

[56] References Cited

U.S. PATENT DOCUMENTS

| | | |
|---|---|---|
| 4,488,787 | 12/1984 | Osawa . |
| 5,121,153 | 6/1992 | Yamada et al. ........................ 396/109 |
| 5,597,999 | 1/1997 | Kinba et al. ........................... 396/125 |
| 5,652,926 | 7/1997 | Saito ..................................... 396/106 |
| 5,655,160 | 8/1997 | Saito ..................................... 396/106 |
| 5,737,645 | 4/1998 | Saito ..................................... 396/106 |
| 5,870,178 | 2/1999 | Akira .................................... 396/106 |
| 5,915,233 | 6/1999 | Nonaka ................................. 396/89 |

OTHER PUBLICATIONS

Camera Review, "Technical Report", No. 30, Jul. 1983, pp. 65–68.

*Primary Examiner*—Russell Adams
*Attorney, Agent, or Firm*—Burns, Doane, Swecker & Mathis, LLP

[57] ABSTRACT

In addition to a focus detecting sensor for phase difference detection, a camera is provided with a light source or a generator for emitting light or ultrasonic waves, and a light receiver or a receiver for receiving the light or the ultrasonic waves reflected from the object. The distance to the object is detected from the intensity of the reflected light or ultrasonic waves and the focusing lens is set at a position close to the in-focus position. Then, the driving range of the focusing lens is limited in accordance with the detected distance, and from the set focusing lens position, focusing by the phase difference detection method is performed within the limited driving range.

14 Claims, 7 Drawing Sheets

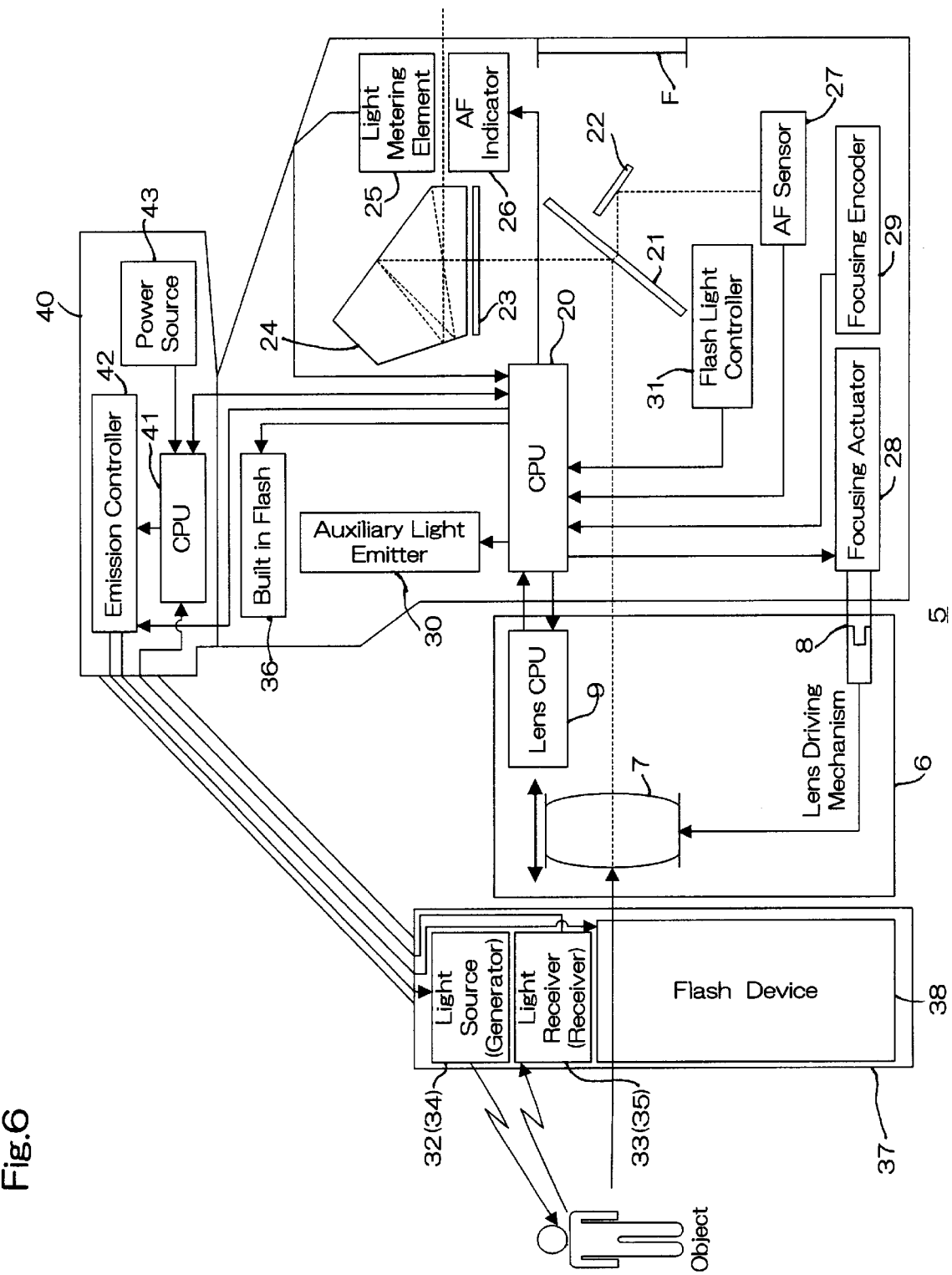

CAMERA

This application is based on application No. 10-134756 filed in Japan, the content of which is hereby incorporated by reference.

BACKGROUND OF THE INVENTION

1. Field of the Invention

The present invention relates to a camera that performs automatic focusing by a phase difference detection method.

2. Description of the Prior Art

Some auto-focus (AF) cameras that automatically focus the taking lens on an object employs the phase difference detection method as the method of detecting the focus condition of the taking lens with respect to an object. In the phase difference detection method, a pair or a plurality of pairs of image detecting sensors such as line sensors or area sensors are arranged on a plane substantially equivalent to a predetermined focal plane where a film and an image sensing device such as a photoelectrically converting device are disposed, and luminous fluxes passing through different areas of the taking lens are directed to different sensors and the focus condition of the taking lens is detected from the distance between the object images on the sensors constituting a pair.

The positions of the object images on the sensors are determined based on the contrast of the images. Therefore, when the contrast of the object is insufficient, the positions of the object images on the sensors cannot be determined, so that the focus condition of the taking lens cannot be detected. Even when the contrast of the object is sufficient, in a case where the focus of the taking lens largely deviates from the in-focus position, the images blur on the sensors, so that the contrast is gone. Consequently, it is difficult to detect the focus condition.

When the focus condition cannot be detected because of insufficient contrast of the images on the sensors, the focusing lens for adjusting the focus included in the taking lens is moved at a comparatively low speed while monitoring the contrast of the images on the sensors, thereby finding the position of the focusing lens that provides the contrast where the detection of the focus condition is possible. This operation is called a low contrast scan or a low contrast search.

The low contrast scan is performed for the entire range where the focusing lens can be driven because it is uncertain whether the taking lens is focused on a position in front of the object or on a position in the rear of the object and how much the focus of the taking lens deviates from the in-focus position. For example, the focusing lens is moved, first, from the position at that time to the near end corresponding to the minimum focusable object distance and then, to the infinity end corresponding to the maximum (infinity) focusable object distance. By doing this, the focus condition can be detected even when the focus of the taking lens largely deviates from the in-focus position.

However, in conventional auto-focus cameras employing the phase difference detection method, the following problems arise when a rather special taking lens such as the one capable of macro photographing in addition to normal photographing is used in combination with the camera:

In macro photographing for photographing an extremely close object so as to be enlarged, since light from a minute area of the object is directed to the entire area of the sensors, the contrast of the images on the sensors decreases. Consequently, even a focus deviation that does not result in insufficient contrast in normal photographing results in insufficient contrast, so that the low contrast scan is performed.

Since a taking lens capable of macro photographing has a wide focusable distance range, the object is apt to be situated outside the range where the focus condition detection is possible. When the object is outside the range where the focus condition detection is possible, the images on the sensors blur, so that the contrast largely decreases. Consequently, the necessity for performing the low contrast scan increases.

In the low contrast scan, since the contrast of the images on the sensors is monitored while the focusing lens is being moved, it is inevitable that the contrast is decreased by the images flowing even though the focusing lens is moved at a comparative low speed. In the macro photographing, since the contrast is lower as mentioned above, it is necessary to perform the scan at a particularly low speed. However, if the scan is performed at a low speed, it will take a long time to find the position of the focusing lens where the focus condition detection is possible. Since the driving range of the focusing lens of the taking lens capable of macro photographing is wide, it takes an extremely long time to scan the entire range. This discomforts the user. This also halves the utility of the automatic focusing that requires swiftness.

In a bright taking lens having a particularly large aperture, since the focusing lens is large and heavy, a great force is necessary for driving the focusing lens. In such a case, if the entire range is scanned in the low contrast scan, much power will be consumed, so that the battery serving as the power source will become exhausted extremely soon. This will make it necessary to provide a large-capacity battery or to frequently change or charge the battery. As a result, the camera will increase in size and weight and inconvenience will be caused when the camera is used.

SUMMARY OF THE INVENTION

The present invention is made in view of the above-described problems, and an object thereof is to provide an auto-focus camera in which the contrast does not readily become insufficient even when the camera is used in combination with a rather special taking lens and the in-focus position can effectively be found even when the contrast is insufficient.

To achieve the above-mentioned object, according to one aspect of the present invention, in a camera having an auto-focus function of detecting a focus condition of a taking lens with respect to an object and imaging light from the object on a predetermined focal plane by moving a focusing lens of the taking lens to a position corresponding to a detected focus condition, the following are provided: a focus condition detector for detecting the focus condition of the taking lens with respect to the object by a phase difference detection method; a distance meter for detecting a distance to the object; a determination device for determining a driving range of the focusing lens in accordance with the distance to the object detected by the distance meter; and a controller.

The controller further moves the focusing lens to the position corresponding to the distance to the object detected by the distance meter and then, determines whether the detection of the focus condition of the taking lens with respect to the object by the focus condition detector is possible or not. When the detection is possible, the focusing lens is moved to the position corresponding to the focus condition detected by the focus condition detector. When the detection is impossible, the position of the focusing lens where the focus condition detection is possible is found by driving the focusing lens within the range determined by the determination device and the focusing lens is moved to the position corresponding to the focus condition detected by the focus condition detector.

This camera performs automatic focusing in two steps. In the first step, the distance to the object is detected by a method other than the phase difference detection method and the focusing lens is moved to the position corresponding to the detected distance to thereby bring the taking lens to a state close to the in-focus state. In the second step, the focus condition of the taking lens is detected by the phase difference detection method and the focusing lens is moved to the position corresponding to the detected focus condition to thereby bring the taking lens to the completely in-focus state.

In performing macro photographing, by bringing the taking lens to a state close to the in-focus state in the first step, the object is substantially sharply imaged on the sensors in the focus condition detection by the phase difference detection method in the second step, so that the contrast does not readily become insufficient. Since the distance to the object is detected by a method other than the phase difference detection method, the distance can reliably be detected even in macro photographing although not with particularly high accuracy.

When the focus condition detection by the phase difference detection method in the second step is impossible at the position of the focusing lens set in the first step, an operation to find the position of the focusing lens where the focus condition detection is possible, for example, the low contrast scan is performed. At this time, the determination of whether the focus condition detection is possible or not is performed not for the entire driving range of the focusing lens but for the range limited in accordance with the distance detected in the first step.

Since the focusing lens has already been set at a position close to the in-focus position, the focusing lens position where the focus condition detection is possible can reliably be found even though the range for which the determination is performed is limited. By limiting the range, the required time is reduced, so that the power consumption for driving the focusing lens is reduced.

The distance meter used in the first step may be any type that employs a method other than the phase difference detection method. For example, the distance meter may be one that has a light source and a light receiver. In that case, the light source emits light to the object, the light receiver receives the light reflected from the object and the distance to the object is detected based on the received light. Moreover, the distance meter may be one that has a generator for emitting ultrasonic waves and a receiver for receiving ultrasonic waves. In that case, the generator emits ultrasonic waves to the object, the receiver receives the ultrasonic waves reflected from the object and the distance to the object is detected based on the received ultrasonic waves.

Moreover, the distance meter may be one that has a light receiver. In that case, the light receiver receives the light from an object illuminator which light is reflected from the object and the distance to the object is detected based on the received light. As the object illuminator, for example, a flash device used for normal photographing and a macro flash device used for macro photographing are usable. The object illuminator may be disposed in any given position such as the camera body or the taking lens. However, since automatic focusing is not in time for photographing even though the illumination light in the actual photographing is used, the light for the preliminary illumination performed prior to photographing is used.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

FIG. 6 shows a fourth embodiment.

DETAILED DESCRIPTION OF THE PREFERRED EMBODIMENTS

Figure 1:
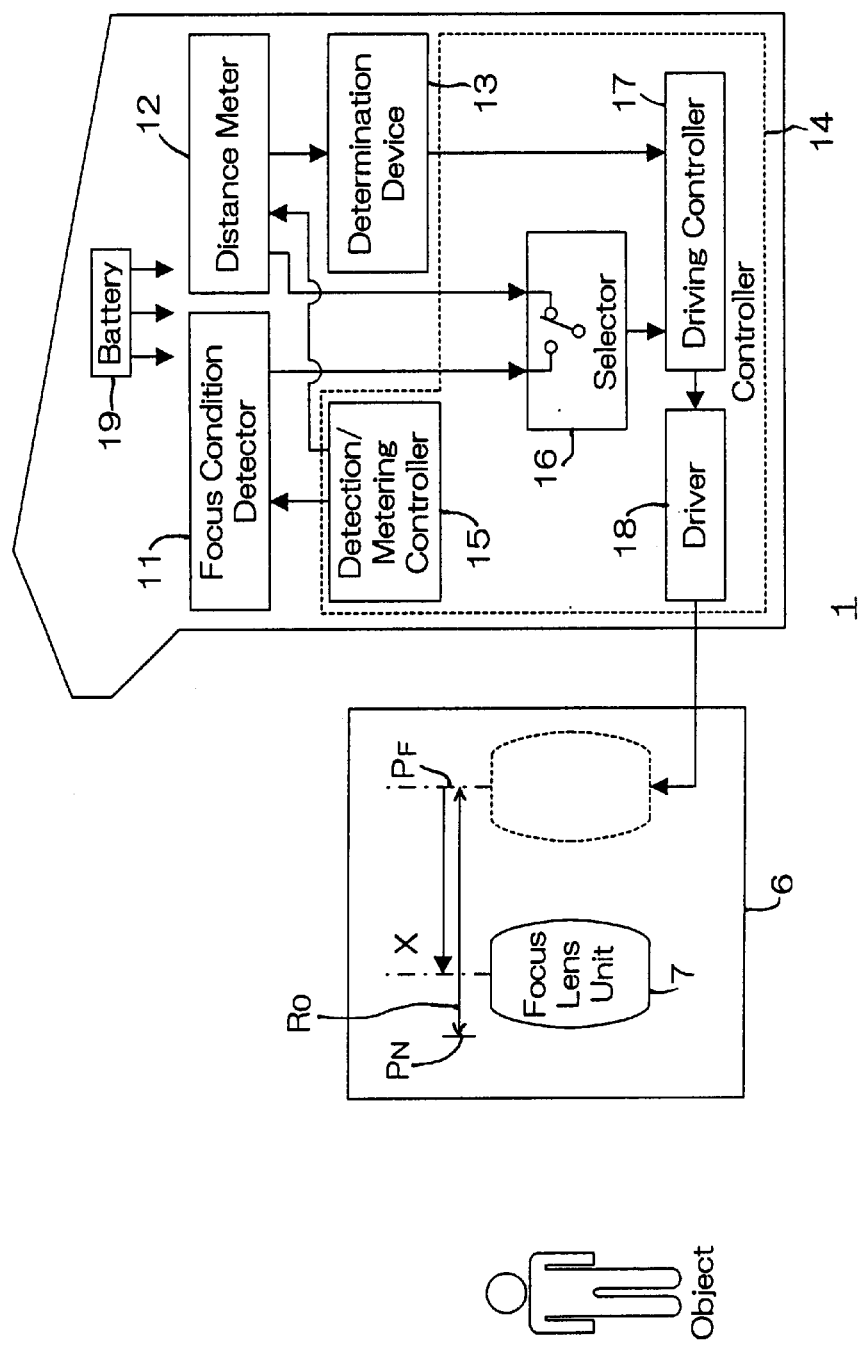
FIGS. 1(a) and 1(b) schematically show a camera structure and a focusing operation thereof common to the following embodiments.
Figure 1B:
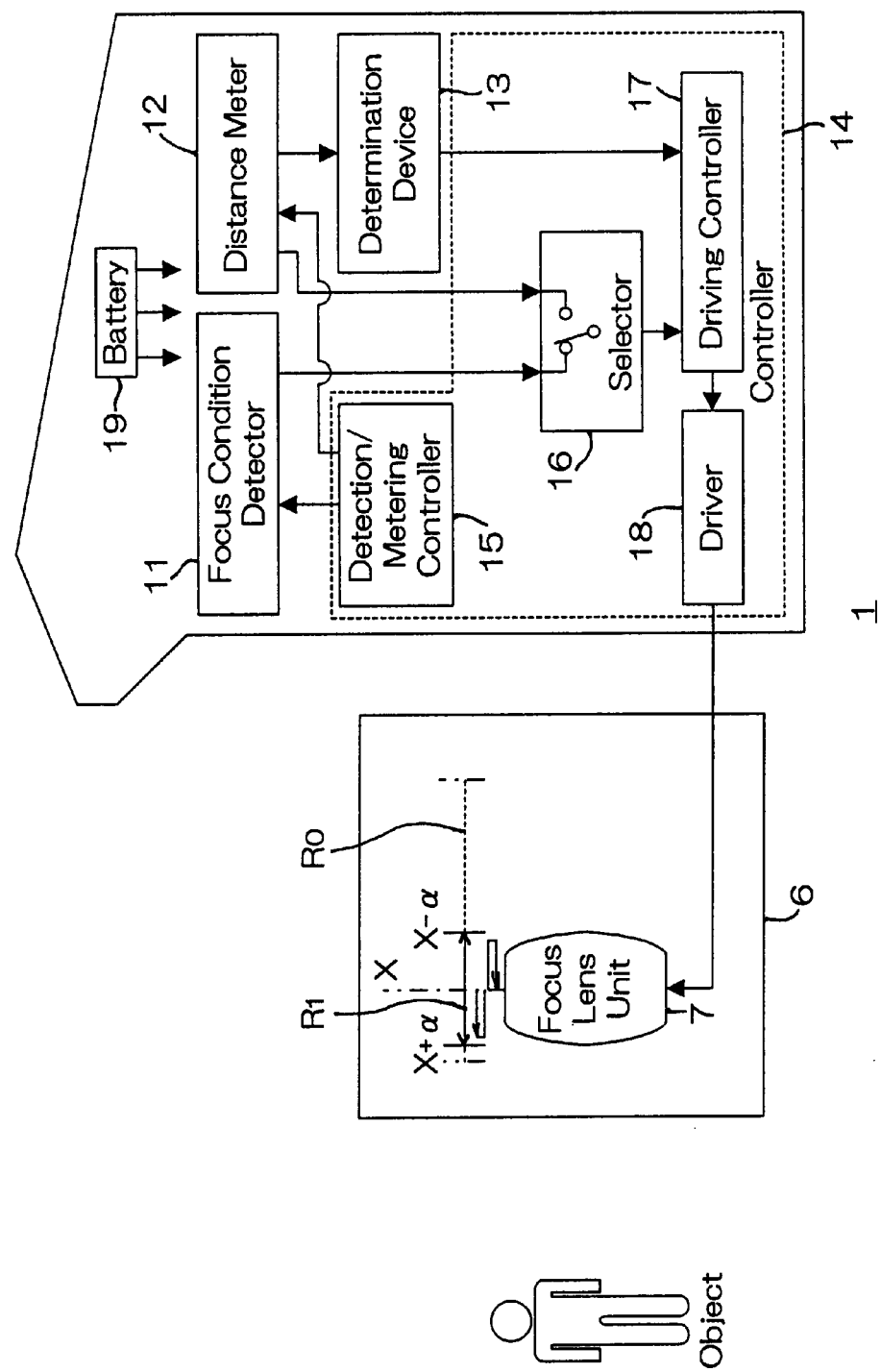

Hereinafter, a basic structure and a focusing operation common to the embodiments will be described, and thereafter, the embodiments will be described. FIGS. 1(a) and 1(b) schematically show a structure and a focusing operation of a camera 1. The camera 1 performs focusing of a taking lens 6 in two steps. FIGS. 1(a) and 1(b) show the first step and the second step of the focusing operation, respectively.

The taking lens 6 comprising a plurality of lens units includes a focusing lens unit 7 for setting the focus position. The focusing lens unit 7 comprises a plurality of lens elements that move in conjunction with one another. Here, the reference designation PN represents the near end position of the focusing lens unit 7 corresponding to the minimum focusable distance of the taking lens 6, and the reference designation PF represents the infinity position of the focusing lens unit 7 corresponding to the maximum (infinity) focusable distance of the taking lens 6. The focusing lens unit 7 can be driven within a range R0 from the infinity end PF to the near end PN.

The camera 1 has a focus condition detector 11, a distance meter 12, a determination device 13 and a controller 14, and is loaded with a battery 19. The focus condition detector 11 detects the focus condition of the taking lens with respect to the object. The distance meter 12 detects the distance to the object. The focus condition detector 11 employs the phase difference detection method. The distance meter 12 is used in the focusing of the first step, whereas the focus condition detector 11 is used in the focusing of the second step.

The determination device 13 determines a driving range R1 of the unit 7 in the second step in accordance with the distance to the object detected by the distance meter 12. While the driving range R1 of the unit 7 in the second step varies according to the detected distance to the object, the variation is limited to a part of the entire driving range R0 and a focusing lens position X corresponding to the detected distance to the object is included in the vicinity of the center thereof.

The controller 14 focuses the taking lens 6 on the object by moving the unit 7 to a position corresponding to the focus condition of the taking lens 6 detected by the focus condition detector 11 and the distance to the object detected by the distance meter 12. The controller 14 functions as a detection/metering controller 15, a selector 16, a driving controller 17 and a driver 18.

The detection/metering controller 15 instructs the focus condition detector 11 and the distance meter 12 to start and end the focus condition detection and the distance metering. The driver 18 provides the unit 7 with a driving force, and comprises an actuator such as a motor. The battery 19 supplies power necessary for the operations of the driver 18 and other parts. The selector 16 selects the output of the distance meter 12 in the first step and selects the output of the focus condition detector 11, and supplies the selected output to the driving controller 17.

The driving controller 17 controls the driving of the unit 7 by the driver 18 based on the output of the focus condition detector 11 or the distance meter 12 supplied from the selector 16. In the first step, the driving controller 17 calculates the position of the unit 7 corresponding to the distance detected by the distance meter 12 and immediately moves the unit 7 to the calculated position X. This brings the taking lens 6 to a state close to the in-focus state.

In the second step, the driving controller 17 brings the taking lens 6 to the completely in-focus state by repeating a processing such that the movement amount and the movement direction of the unit 7 are calculated from the output of the focus condition detector 11, the unit 7 is moved by the calculated amount and the movement amount and the movement direction of the unit 7 are newly calculated from the output of the focus condition detector 11.

When the movement amount and the movement direction of the unit 7 cannot be obtained because the contrast of the images on the sensors of the focus condition detector 11 is too low at the position X of the unit 7 set in the first step, the driving controller 17 drives the unit 7 within the range R1 determined by the determination device 13 to thereby find the position where the contrast of the images on the sensors is sufficient for obtaining the movement amount and the movement direction. Then, the driving controller 17 performs the above-described processing to thereby bring the taking lens 6 to the completely in-focus state.

Figure 2:
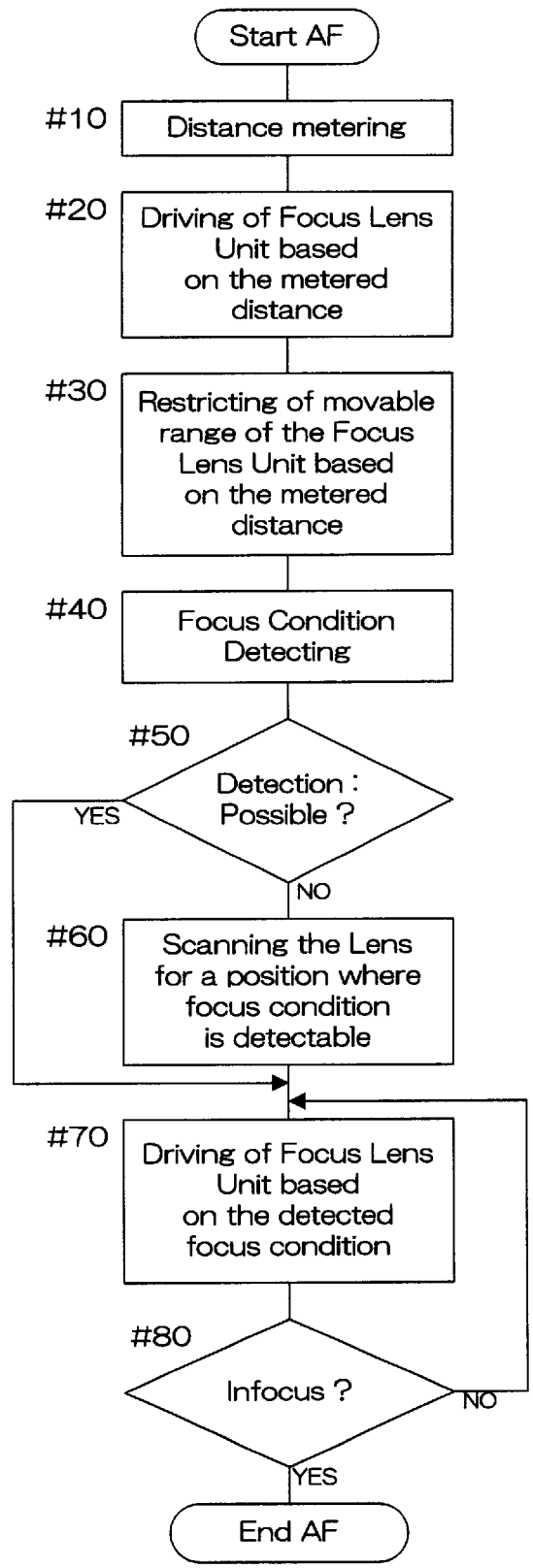
FIG. 2 is a flowchart showing the flow of the focusing operation of the camera.

The flow of the focusing operation in the camera 1 is summarized in the flowchart of FIG. 2. First, the distance to the object is detected by the distance meter 12 (step #10) and the focusing lens unit 7 is driven so as to move to the position corresponding to the detected distance (#20). This brings the taking lens 6 to a state close to the in-focus state. Then, the driving range R1 of the unit 7 is determined based on the detected distance (#30).

Then, the focus condition of the taking lens 6 with respect to the object is detected by the focus condition detector 11 (#40) and it is determined whether the detection is possible or not (#50). When the detection is possible, the unit 7 is driven based on the detected focus condition (#70) and the taking lens 6 is brought to the in-focus state (#80). When the detection is impossible, the unit 7 is driven within the range R1 determined at #30 to thereby find the lens position where the detection is possible (#60). Then, the process proceeds to #70.

As the processing to find the position of the unit 7 where the detection of the focus condition of the taking lens 6 is possible, the conventionally used low contrast scan in which the unit 7 is moved while monitoring the contrast of the images on the sensors may be employed, or a method in which the unit 7 is moved by a minute step width and the contrast of the images on the sensors is monitored with the unit 7 being stationary may be employed. Since the driving range R1 is limited, it is possible to scan the entire range R1 in a short time even though the speed of the low contrast scan is reduced in order to reduce the flow of the images on the sensors, and the power consumption necessary for driving is small.

The taking lens 6 may be a type that is fixed to the body of the camera 1 or may be an interchangeable lens detachably attachable to the camera body. In the case of the interchangeable lens, the user can select a lens according to the use from among various types of lenses having different focal lengths and brightnesses to use it in combination with the camera 1. Even when a lens capable of macro photographing in addition to normal photographing is attached to the camera 1, by the above-described control, the use of the focusing by the phase difference detection method is facilitated wherever the object is situated between close range and infinity.

Figure 3:
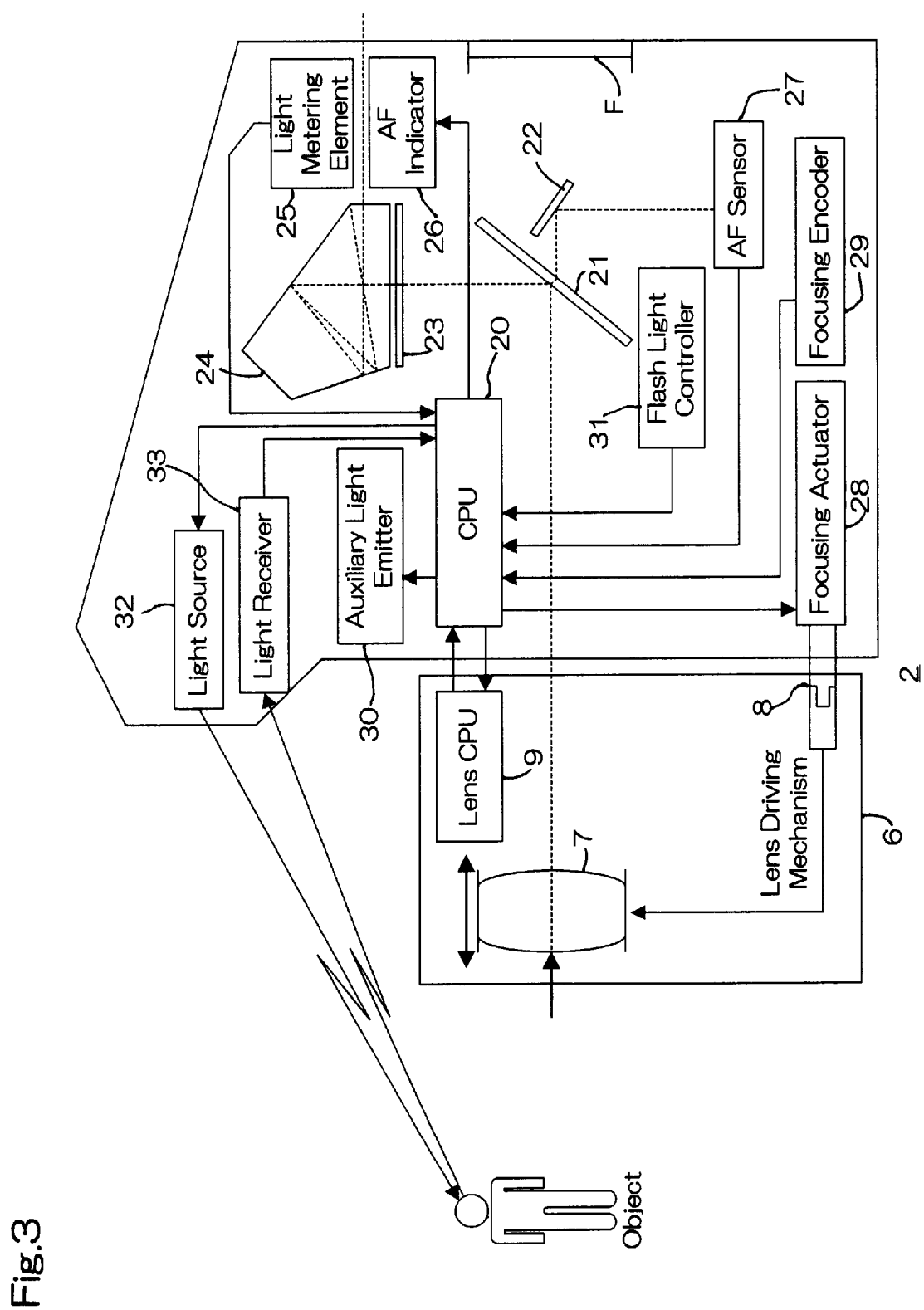
FIG. 3 shows a first embodiment.

The structure of an auto-focus camera according to a first embodiment of the present invention is shown in FIG. 3. A camera 2 is a single lens reflex camera of a lens interchangeable type, and various types of taking lenses 6 can be attached thereto. The taking lens 6 has the focusing lens unit 7, a lens driving system 8 for transmitting the driving force from the camera 2 to the unit 7, and a lens CPU 9 for performing control associated with the whole of the taking lens 6 while communicating with the camera 2.

The camera 2 has a main mirror 21 and a sub mirror 22 of a flip-up type, a screen 23 and a pentagonal roof prism 24. A film F is placed in the rear of the sub mirror 22. The main mirror 21 and the sub mirror 22 are flipped up at the time of photographing so as to retreat from the optical path from the taking lens 6 to the film F. A light metering device 25 for detecting the brightness of the object and an AF display 26 for displaying information on focusing are disposed in the vicinity of the prism 24. A focus detecting sensor 27 (hereinafter, referred to as AF sensor) is disposed below the sub mirror 22. The AF sensor 27 is a sensor of the phase difference detection method constituting the focus condition detector 11, and is disposed in a position equivalent to the film F.

The camera 2 also has a focusing actuator 28 constituting the driver 18 for driving the focusing lens unit 7, a focusing encoder 29 for detecting the driving amount of the focusing actuator 28, an auxiliary light source 30 used on an as needed basis in the focus condition detection by the phase difference detection method, and a flash light control module 31 for detecting the brightness of the illuminated object to provide an instruction to stop flash emission in flash photographing. The flash device, which is externally attached to the camera 2, is not shown in the Figure.

In addition to these elements, the camera 2 has a CPU 20, a light source 32 and a light receiver 33. The light source 32 emits light to the object. The light receiver 33 detects the light of the light source 32 reflected from the object. The light source 32 and the light receiver 33 are used for detecting the distance to the object and constitute the distance meter 12.

The CPU 20 controls the whole of the camera 2 and communicates with the lens CPU 9 to control the taking lens 6. The control operation by the CPU 20 associated with focusing includes the following: to obtain from the lens CPU 9 information on the taking lens 6 such as the adjustable distance range, that is, focusable range and the aperture adjustable range; to instruct the light source 32 to emit light in the first step; to calculate the distance to the object based on the quantity of the light received by the light receiver 33; to provide an instruction to move the focusing lens unit 7 to the position corresponding to the calculated distance; to determine the driving range R1 of the unit 7 in the second step based on the calculated distance and the obtained adjustable distance range; to provide an instruction to drive the unit 7 based on the output of the AF sensor 27 in the second step; and to display information on focusing on the AF display 26. Thus, the CPU 20 functions as the determination device 13, the detection/metering controller 15, the selector 16 and the driving controller 17.

Figure 4:
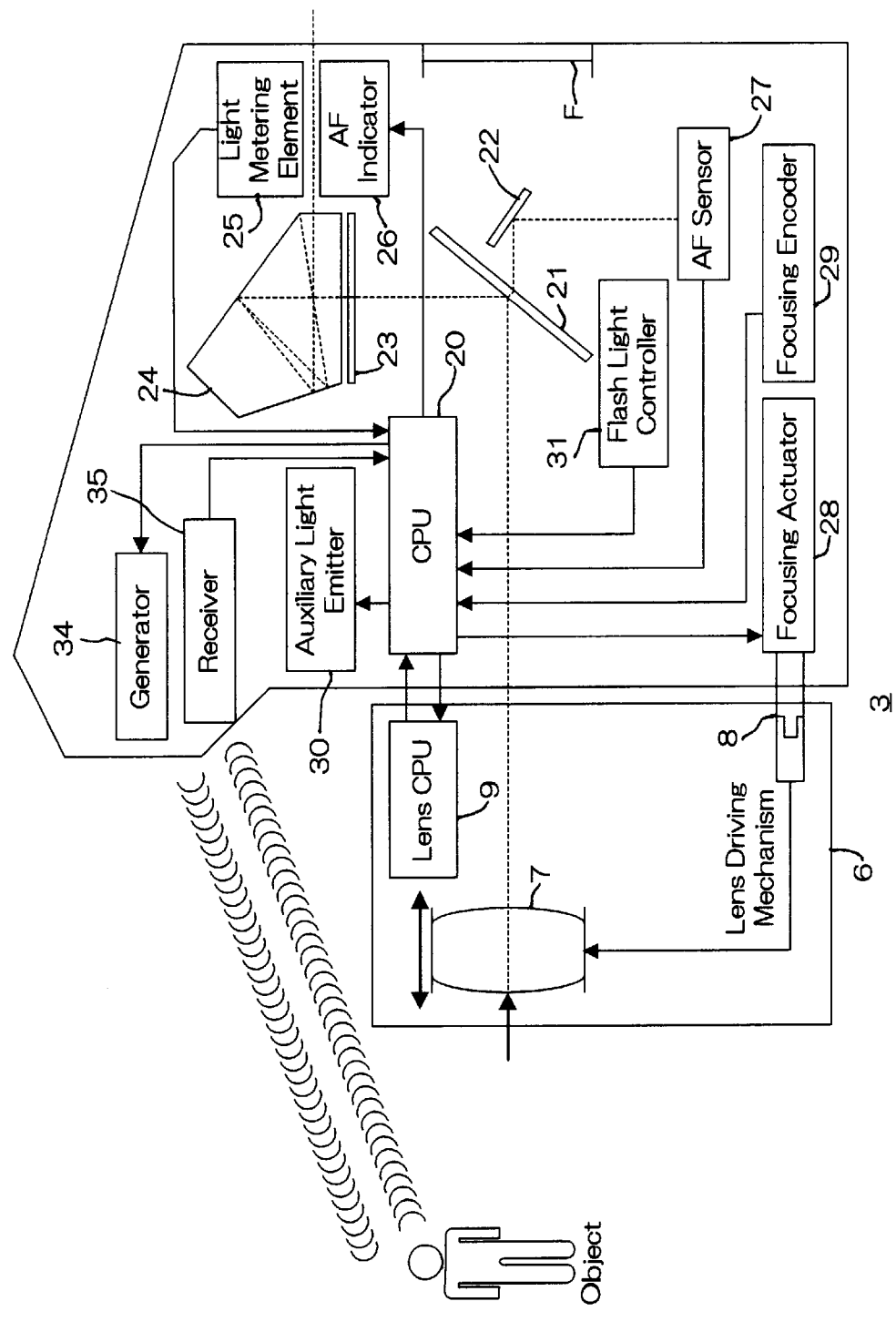
FIG. 4 shows a second embodiment.

The structure of a camera 3 according to a second embodiment is shown in FIG. 4. The camera 3 has a generator 34 and a receiver 35 instead of the light source 32 and the light receiver 33 of the above-described camera 2. Except this, the structure of the camera 3 is the same as that of the camera 2. Therefore, the parts performing the same or like functions are designated by the same reference numbers and no overlapping descriptions will be given.

The generator 34 emits ultrasonic waves to the object. The receiver 35 detects the ultrasonic waves reflected from the object. The generator 34 and the receiver 35 are used for detecting the distance to the object and constitute the distance meter 12. The CPU 20 calculates the distance to the object from the intensity of the ultrasonic waves received by the receiver 35.

Figure 5:
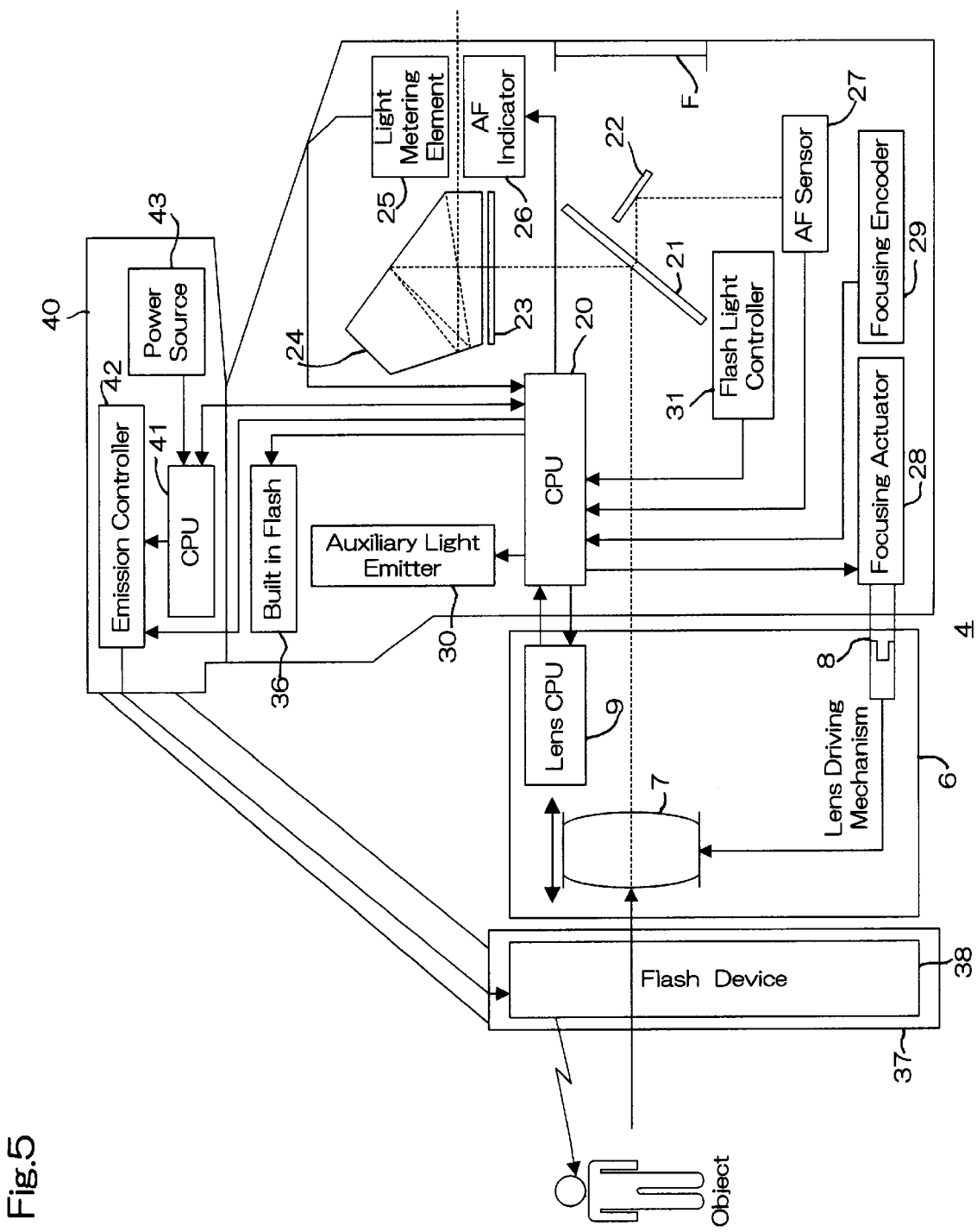
FIG. 5 shows a third embodiment.

The structure of a camera 4 according to a third embodiment is shown in FIG. 5. The camera 4 has a built-in flash 36 for illuminating the object in normal photographing and a flash 38 for illuminating the object in macro photographing incorporated in a macro flash unit 37 detachably attachable in front of the taking lens 6. In order to control the light emitting operation by the flash 38 and to supply power for light emission, the camera 4 has a flash controller 40 which includes a CPU 41 and a light emission controller 42 and is loaded with a battery power source 43.

In performing macro photographing, for the first step of focusing, the CPU 20 causes, through the light emission controller 42, the flash 38 to emit a small quantity of light to the object and calculates the distance to the object from the quantity of the light received by the light metering device 25 at that time prior to photographing. In normal photographing, instead of the flash 38, the built-in flash 36 emits light and the distance to the object is calculated from the quantity of the light received by the light metering device 25 in a like manner. Thus, in the camera 4 of this embodiment, the flash 38, the built-in flash 36 and the light metering device 25 correspond to the distance meter 12.

The structure of a camera 5 according to a fourth embodiment is shown in FIG. 6. In the camera 5, the macro flash unit 37 of the camera 4 of the third embodiment is provided with the light source 32 and the light receiver 33 of the camera 2 of the first embodiment. The light emission controller 42 of the macro flash controller 40 controls both of the flash 38 and the light source 32. The CPU 41 transmits the output of the light receiver 33 to the CPU 20.

For the first step of focusing, the CPU 20 causes, through the light emission controller 42, the light source 32 to emit light and calculates the distance to the object from the quantity of the reflected light received by the light receiver 33. Thus, like in the camera 2, the light source 32 and the light receiver 33 constitute the distance meter 12. In this embodiment, the built-in flash 36 and the flash 38 are used only for illuminating the object.

As shown in the parentheses in FIG. 6, the macro flash unit 37 may be provided with the generator 34 and the receiver 35 of the second embodiment instead of the light source 32 and the light receiver 33. In that case, it is necessary for the light emission controller 42 to control only the flash 38. The generator 34 is controlled by the CPU 41. The output of the receiver 35 representative of the intensity of the ultrasonic waves reflected from the object is transmitted to the CPU 20 through the CPU 41.

While description has been given with single lens reflex cameras using film as examples, the present invention is applicable not only to single lens reflex cameras but also to other types of cameras such as digital still cameras and video cameras. When the present invention is applied to a digital still camera or a video camera, a photoelectrically converting device is disposed in the position of the film F, and a circuit for processing the output signals thereof to convert them into digital signals or video signals and a recording medium for storing the signals therein are provided. A known technology can be used for the structure.

In the cameras of the above-described embodiments, prior to the focus condition detection by the phase difference detection method, the distance to the object is detected by a different method and the focusing lens is set in the vicinity of the in-focus position. Therefore, the focus condition detection by the phase difference detection method is highly reliable. Consequently, the taking lens can be quickly brought to the in-focus state by the phase difference detection method not only in normal photographing but also in macro photographing.

Moreover, even when the focus condition detection by the phase difference detection method cannot be performed, since the focusing lens is already situated in the vicinity of the in-focus position, the position of the focusing lens where the focus condition detection is possible can be quickly found. In addition, since the driving range of the focusing lens at that time is limited based on the approximate distance to the object, inefficiency is reduced in the driving of the focusing lens, so that the position where the detection is possible can be more quickly found. The reduction of inefficiency in the driving of the focusing lens enables the focusing lens to be driven at a low speed. Consequently, the reliability of the focus condition detection in macro photographing improves, and the power necessary for the driving is reduced, so that the battery life is long even when a large-size taking lens is used.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera having an auto-focus function, comprising:
   a distance meter which measures a distance to an object;
   a focus condition detector which detects the focus condition of a taking lens with respect to the object by a phase difference detection method; and
   a controller which controls said distance meter to measure the distance to the object, controls the focusing lens of the taking lens to move toward the position corresponding to the measured distance to the object, and then controls said focus condition detector to detect the focusing condition in a condition where the focusing lens reaches the position corresponding to the measured distance.

2. A camera according to claim 1, wherein said controller determines whether the detection of the focus condition of the taking lens with respect to the object by said focus condition detector is possible or not in a condition where the focusing lens reaches the position corresponding to the measured distance to the object, and then controls the focusing lens to move toward the position corresponding to the detected focus condition when the focus condition detection is determined to be possible.

3. A camera according to claim 2, wherein said controller determines a driving range of the focusing lens of the taking lens in accordance with the distance to the object measured by the distance meter.

4. A camera according to claim 3, wherein said controller controls the focusing lens to move within the determined range for finding the position of the focusing lens where the focus condition detection is possible when the focus condition detection is determined to be impossible.

5. A camera according to claim 1, wherein said distance meter includes a light source to emit light toward the object and a light receiver to receive the light reflected by the object.

6. A camera according to claims 1, wherein said distance meter includes a generator to generate ultrasonic wave toward the object and a receiver to receive the ultrasonic wave reflected by the object.

7. A control method of a camera comprising steps of:
measuring a distance from the camera to the object;
driving a focusing lens of a taking lens to a position corresponding to the measured distance; and
detecting a focus condition of the taking lens with respect to the object by a phase difference detection method in a condition where the focusing lens reaches the position corresponding to the measured distance.

8. A control method according to claim 7 further comprising a step of determining whether the detection of the focus condition of the taking lens with respect to the object is possible or not in a condition where the focusing lens reaches the position corresponding to the measured distance to the object.

9. A control method according to claim 8 further comprising a step of driving the focusing lens toward the position corresponding to the detected focus condition when the focus condition detection is determined to be possible.

10. A control method according to claim 9 further comprising a step of determining, after the distance measuring step, a driving range of the focusing lens of the taking lens in accordance with the measured distance to the object.

11. A control method according to claim 10 further comprising a step of driving the focusing lens within the determined driving range for finding the position of the focusing lens where the focus condition detection is possible when the focus condition detection is determined to be impossible.

12. A control method of a camera comprising steps of:
detecting a distance to the object by a method other than a phase difference detection method;
driving a focusing lens of a taking lens to the position corresponding to the detected distance to thereby bring the taking lens to a state close to the in-focus state;
detecting the focus condition of the taking lens by a phase difference detection method; and
driving the focusing lens to the position corresponding to the detected focus condition to thereby bring the taking lens to the in-focus state.

13. A control method according to claim 12 further comprising a step of executing an operation to find the position of the focusing lens where the focus condition detection is possible when the focus condition detection by the phase difference detection method in the detecting step is impossible.

14. A control method according to claim 13, wherein, in said executing step, the focusing lens is driven within a range limited in accordance with the detected distance.

* * * * *